United States Patent [19]

Dobbins et al.

[11] Patent Number: 5,043,002

[45] Date of Patent: Aug. 27, 1991

[54] METHOD OF MAKING FUSED SILICA BY DECOMPOSING SILOXANES

[75] Inventors: Michael S. Dobbins, Wilmington, N.C.; Robert E. McLay, Corning, N.Y.

[73] Assignee: Corning Incorporated, Corning, N.Y.

[21] Appl. No.: 568,230

[22] Filed: Aug. 16, 1990

[51] Int. Cl.$^5$ .......................... C03B 19/06; C03B 19/14
[52] U.S. Cl. ...................................... 65/3.12; 65/18.2; 65/60.52; 423/336
[58] Field of Search ................. 427/423; 423/336; 65/3.12, 60.52, 901, 18.2, 18.3

[56] References Cited

U.S. PATENT DOCUMENTS

| | | | |
|---|---|---|---|
| 3,806,224 | 4/1974 | MacChesney et al. | 65/3.12 |
| 3,823,995 | 7/1974 | Carpenter | 65/3.12 |
| 3,932,162 | 1/1976 | Blankenship | 65/3.12 |
| 4,472,510 | 9/1984 | January | 65/901 |
| 4,501,602 | 2/1985 | Miller et al. | 65/18.2 |

FOREIGN PATENT DOCUMENTS 60-90838  5/1985  Japan ........................... 65/60.52

Primary Examiner—Richard V. Fisher
Assistant Examiner—John M. Hoffmann
Attorney, Agent, or Firm—C. S. Janes, Jr.

[57] ABSTRACT

This invention relates to the production of high purity fused silica glass through oxidation or flame hydrolysis of a vaporizable silicon-containing compound. More particularly, this invention is directed to the use of vaporizable, halide-free compounds in said production. In the preferred practice, a polymethylsiloxane comprises said vaporizable, halide-free compound.

26 Claims, 3 Drawing Sheets

METHOD OF MAKING FUSED SILICA BY DECOMPOSING SILOXANES

BACKGROUND OF THE INVENTION

Various processes are known in the art that involve the production of metal oxides from vaporous reactants. The most basic requirements of such processes necessitate a feedstock solution, a means of generating and transporting vapors of the feedstock solution (hereafter called vaporous reactants) and an oxidant to a reaction site, and a means of catalyzing oxidation and combustion coincidentally, producing finely divided, spherical aggregates, called soot. This soot may be collected in any number of ways, ranging from a collection chamber to a rotating mandrel, and simultaneously or subsequently heat treated to form a non-porous, transparent, high purity glass article. The means for executing these reactions is usually a specialized piece of equipment with a unique arrangement of nozzles and burners.

Much of the initial research that led to the development, and thus patent protection, of a plethora of such processes focused on the production of fused silica. Selection of the appropriate feedstock was found to be as important in the production of high purity fused silica as the equipment used in its production. Consequently, a material was identified that could generate the needed vapor pressure of 200–300 mm at temperatures below 100° C.; the high vapor pressure of silicon tetrachloride ($SiCl_4$) isolated it as a convenient vapor source for soot generation, thus launching the discovery and use of a series of similar chloride-based feedstocks. This factor, more than any other, is responsible for the presently accepted use of $SiCl_4$, $GeCl_4$, $POCl_3$, and $BCl_3$ as vapor sources, even though these materials have certain chemically undesirable properties.

Silicon, germanium, zirconium, and titanium are metals often used in halide form as vaporous reactants for forming high purity metal oxide glasses. However, $SiCl_4$ has been the industry standard among metal-source vaporous reactants used over the years for the production of high purity silica glasses. As disclosed in U.S. Pat. No. 3,698,936, one of several reactions may be employed to produce high purity fused silica via oxidation of $SiCl_4$; namely:

(1) $SiCl_4 + O_2 \rightarrow SiO_2 + Cl_2$,
(2) $SiCl_4 + O_3 \rightarrow SiO_2 + Cl_2$, or
(3) $SiCl_4 + H_2O \rightarrow SiO_2 + HCl$, whereby burners or jet assemblies are utilized in feeding the reactant gases and vapors to a reaction space. There are inherent economic disadvantages to each of these reactions.

These reactions, which oxidize $SiCl_4$ through pyrolysis and hydrolysis, have the disadvantage of producing a very strong acid by-product. While the first two reactions occur theoretically, it is likely that an auxiliary fuel is needed to achieve pyrolytic temperature, thus leading to hydrolysis of the silicon tetrachloride and formation of hydrochloric acid (HCl). Such a by-product is not only a detriment to many deposition substrates and the reaction equipment, but also is a detriment to the environment. Emission abatement systems have proven to be very expensive due to down-time, loss, and maintenance of equipment caused by the corrosiveness of HCl.

The first reaction, which utilizes oxygen as it occurs naturally, requires elevated reaction temperatures which, generally, are difficult to maintain without using specialized equipment. The second reaction requires ozone, an unstable form of molecular oxygen that not only warrants special handling, but also must be manufactured on site due to a lack of commercial availability. Notwithstanding the handling and disposal of the HCl by-product necessitated by the hydrolysis and pyrolysis of $SiCl_4$, the third reaction, also hydrolysis of $SiCl_4$, tends to be the preferred commercial method of producing fused silica for economic reasons.

Though hydrolysis of $SiCl_4$ has been the preference of industry for producing high purity fused silica over the years, the enhanced global sensitivity to environmental protection has led to more strict government regulation of point source emissions, prompting a search for less environmentally pernicious feedstocks. In new point source emission regulations, HCl, the by-product of hydrolyzing $SiCl_4$, as well as many particulate pollutants, has to be cleansed from exhaust gases prior to their release into the atmosphere. The economic consequences of meeting these regulations have made commercial production of fused silica by downstream removal of HCl and other metal oxides from halide-based feedstocks less attractive to industry.

As an alternative, high purity fused quartz or silica may also be produced by thermal decomposition and oxidation of silane, a compound that requires taking safety measures in handling due to the violent reaction caused when air is introduced into a closed container of silane. Silane is commonly reacted with carbon dioxide, nitrous oxide, oxygen, or water to produce a high purity material that is useful in producing, among other things, semiconductor devices. However, silane has proven to be much too expensive and reactive to be considered for commercial use except possibly for extremely high purity applications.

The novelty of the invention described herein lies in the replacement of $SiCl_4$ in vapor deposition processes with a halide-free, silica-source compound, thus greatly reducing, if not eliminating, the production of HCl. The advantages of operating under a halide-free system include: reduced pollution abatement requirements and reduced equipment losses and maintenance due to the corrosive nature of HCl.

The teachings of the instant invention are easily adapted to known methods of producing high purity fused silica by flame pyrolysis or hydrolysis, such as those disclosed in the early patents by Nordberg (U.S. Pat. No. 2,239,551) in 1941 and Hyde (U.S. Pat. No. 2,272,342) in 1942. It is anticipated that this process alteration may be adapted to a variety of deposition/collection techniques as well. Therefore, it is an object of this invention to provide an improved method of making high purity fused silica by utilizing alternative silicon-source compounds, thus greatly reducing, if not eliminating, the need for elaborate pollution abatement equipment.

While it is recognized that the primary application of the instant invention relates to the production of fused silica, the technology applied herein is generally applicable in instances where a high purity metal oxide glass is desired.

It is a further object of this invention to provide an improved method of making high purity metal oxide glasses through the use of alternative metal oxide source compounds, thereby greatly reducing the need for expensive pollution abatement systems.

SUMMARY OF THE INVENTION

The instant invention utilizes halide-free, silicon-containing compounds as a replacement for the halide-based source feedstocks that are often oxidized by flame hydrolysis or pyrolysis, to produce transparent, high-purity silica glass articles. Fused silica glass produced through the use of silicon-containing compounds as the feedstock components results in carbon dioxide and water as by-products. We have found that polymethylsiloxanes are particularly useful as substitutes for halide-based, silicon-containing compounds, and of that family of siloxanes the polymethylcyclosiloxanes perform exceptionally well. Hexamethyldisiloxane (HMDS) is illustrative of an operable polymethylsiloxane and hexamethylcyclotrisiloxane (HMCTS), octamethylcyclotetrasiloxane (OMCTS), and decamethylcyclopentasiloxane (DMCPS) are representative of operable polymethylcyclosiloxanes. OMCTS and DMCPS have been found to be the mos preferred.

Methyltrimethoxysilane (MTMS) has also been shown to be operable as a feedstock for producing fused silica of high purity, but it is very expensive and is more difficult to control in the combustion flame. Hence, whereas MTMS can be used as a substitute for halide-based, silicon-containing compounds, the use of polymethylsiloxanes is preferred.

In summary, the halide-free, silicon-containing compounds found to be operable in the instant invention are selected from the group consisting of MTMS and polymethylsiloxanes with the latter family of compounds being preferred, and of that latter family of compounds the polymethylcyclosiloxanes being the most preferred.

It will be appreciated that, similarly to the current commercial processes for doping fused $SiO_2$ articles produced via the hydrolysis/oxidation of $SiCl_4$ with various metals in order to modify the chemical and/or physical properties thereof, the fused $SiO_2$ articles prepared in accordance with the present invention can likewise be doped with metals. For example, fused $SiO_2$ articles have been doped commercially with $Al_2O_3$, $B_2O_3$, $GeO_2$, $P_2O_5$, and $TiO_2$ utilizing halide-containing compounds of aluminum, boron, germanium, phosphorous, and titanium, respectively. Like dopants can be utilized in the present inventive process but would, of course, provide a source of halide emissions. Consequently, to eliminate point source emissions of halides, organometallic compounds of the dopant metals will be employed. For example, isopropyl titanate and titanium ethoxide can be used as sources of titanium and methylborate can furnish the dopant source of boron. Further examples of operable organometallic dopants are found in U.S. Pat. No. 4,501,602 (Miller et al.). That patent describes the production of glass and glass/ceramic articles via a vapor phase oxidation process wherein $\beta$-diketonate complexes of metals selected from Groups IA, IB, IIA, IIB, IIIA, IIIB, IVA, IVB, and the rare earth series of the Periodic Table are vaporized, the vapor is transported to an oxidation site, such as a burner or a hot plasma zone which is adjacent to a deposition substrate or within a deposition tube, and oxidized in the vapor phase to form particulate metal oxide soot. $\beta$-diketonate complexes are also available of metals in Group VA of the Periodic Table, notably vanadium and tantalum. Accordingly, the use of $\beta$-diketonate complexes provides a vaporizable source for a wide variety of dopant metals. In summary, our invention comprehends doping of fused $SiO_2$ articles with $P_2O_5$ and/or at least one metal oxide selected from Groups IA, IB, IIA, IIB, IIIA, IIIB, IVA, IVB, VA, and the rare earth series of the Periodic Table.

PRIOR ART

A plethora of patents have issued that describe the production of high purity metal oxides, and particularly fused silica, from a halide-based feedstock encompassed in or feeding into a specialized piece of equipment. Such equipment has featured a number of burner arrangements and feedstock delivery systems, all based on the oxidation of a metal halide through flame hydrolysis or pyrolysis. Illustrative of this fact is U.S. Pat. No. 4,491,604 wherein trichlorosilane, dichlorosilane, and silicon tetrachloride are flame hydrolyzed to form soot, and U.S. Pat. No. 3,666,414 wherein silicon halides, such as silicon chloroform, are flame hydrolyzed. In similar processes, U.S. Pat. Nos. 3,486,913 and 2,269,059 teach of oxidation of halides: volatilized inorganic halide components such as $TiCl_4$, $CrCl_3$, $CrO_2Cl_2$, $SiCl_4$, $AlCl_3$, $ZrCl_4$, $FeCl_2$, $FeCl_3$, $ZnCl_2$, or $SnCl_4$ oxidized with air, steam, or oxygen are employed in '913; while silicon halides such as $AlCl_3$ and $ZrCl_4$ are employed in '059. None of compounds cited in these references coincides with the halide-free, silicon-containing compounds of the instant invention, however.

U.S. Pat. No. 3,416,890 discloses a process for preparing finely-divided metal or metalloid oxides by the decomposition of a metal or metalloid perhalide in a flame produced by the combustion of an oxidizing gas and an auxiliary fuel, such as carbon disulfide, carbon selenide sulfide, or carbon thiophosgene, consisting of a hydrogen-free compound containing sulfur bonded directly to carbon. The stated reference does not utilize the halide-free, silicon-containing compounds employed in the instant invention.

U.S. Pat. No. 2,239,551 discloses a method of making glass by decomposing a gaseous mixture of glass forming compounds in a flame of combustible gas, said mixture being used in the formation of anhydrous oxides of silicon, aluminum, and boron from decomposable compounds such as ethyl or methyl silicate, silicochloroform, silicon tetrafluoride, silicon tetrachloride, methyl borate, boron hydride, boron fluoride, and aluminum chloride. The stated reference does not mention any of the halide-free, silicon-containing compounds deemed to be the essence of the instant invention.

U.S. Pat. No. 2,326,059 details a technique for making silica-rich, ultra-low expansion glass by vaporizing tetrachlorides of Si and Ti into the gas stream of an oxy-gas burner, depositing the resultant mixture to make a preform, vitrifying the preform at 1500° C. to make an opal glass, and firing the opal preform at a higher temperature to cause it to become transparent. Unlike the instant invention, the stated reference does not employ the use of the halide-free, silicon-containing compounds required in the present inventive process.

U.S. Pat. No. 2,272,342 details a method of producing glass articles containing vitreous silica by vaporizing a hydrolyzable compound of silicon such as silicon chloride, silicochloroform, methyl silicate, ethyl silicate, silicon fluoride, or mixtures thereof, using a water bath. The silicon compound vapor is hydrolyzed by water vapor in the flame of a burner and the resulting amorphous oxide is collected and subsequently sintered until a transparent glass results. The stated reference does not mention any of the halide-free, silicon-containing compounds forming the basis of the instant invention.

U.S. Pat. No. 4,501,602 was referred to above as describing the production of particulate metal oxide soot through the vapor phase deposition of β-diketonate complexes of metals from Groups IA, IB, IIA, IIB, IIIA, IIIB, IVA, IVB, and the rare earth series of the Periodic Table. Not only is no mention made of the halide-free, silicon-containing compounds required in the instant invention, but also the sole reference to a silicon-containing compound is $SiCl_4$.

Also cited in the art are several patents wherein silane and modifications thereof have been used in producing high purity fused silica. For example:

U.S. Pat. No. 3,117,838 describes a method of producing very pure fused quartz or silica by the combined thermal decomposition and oxidation of silane wherein either carbon dioxide, nitrous oxide, or water vapor and silane are fed into a burner or torch jet and the flame allowed to impinge on a carbon substrate upon which silica is deposited. Unlike the instant invention, the stated reference does not employ the use of the halide-free, silicon-containing compounds required in the present inventive method.

U.S. Pat. No. 4,810,673 discloses a method of synthesizing high quality silicon oxides by chemical vapor deposition of a source gas mixture which includes a halogenated silane component and an oxygen source, namely dichlorosilane and nitrous oxide. Unlike the instant invention, the stated reference does not employ the use of a halide-free compound as a silicon-source compound.

U.S. Pat. No. 4,242,487 discloses a method of producing a heat resistant, semi-inorganic compound that is useful as a material for various heat resistant materials by reacting an organoborosiloxane compound with at least one of the group of aliphatic polyhydric alcohols, aromatic alcohols, phenols, and aromatic carboxylic acids at 250° C. to 450° C. in an inert atmosphere. The stated reference does not mention the halide-free, silicon-containing compounds deemed to be the essence of the instant invention.

DESCRIPTION OF PREFERRED EMBODIMENTS

In the most preferred embodiment of the instant invention octamethylcyclotetrasiloxane (OMCTS), represented by the chemical formula

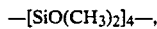

—[SiO(CH$_3$)$_2$]$_4$—, is the halide-free, cyclosiloxane compound used as the feedstock in the fused silica boule process, wherein large boules of high purity fused silica are produced, or in the vapor deposition processes utilized in making high purity fused silica for optical waveguide applications.

Fused silica produced by oxidation of OMCTS results in the production of carbon dioxide and water as by-products.

The conventional boule process used in making fused silica is a one-step process, whereas the conventional vapor deposition process used in making silica glass for optical waveguide applications is a three-step process.

In the conventional boule process, a carrier gas is bubbled through a $SiCl_4$ feedstock that is maintained at a specified low temperature. The vaporous $SiCl_4$ is entrained in the carrier gas and is thereby transported to the reaction site. The reaction site is comprised of a number of burners that combust and oxidize the vaporous $SiCl_4$ at a temperature greater than 1700° C.

EXAMPLE 1

Figure 1:
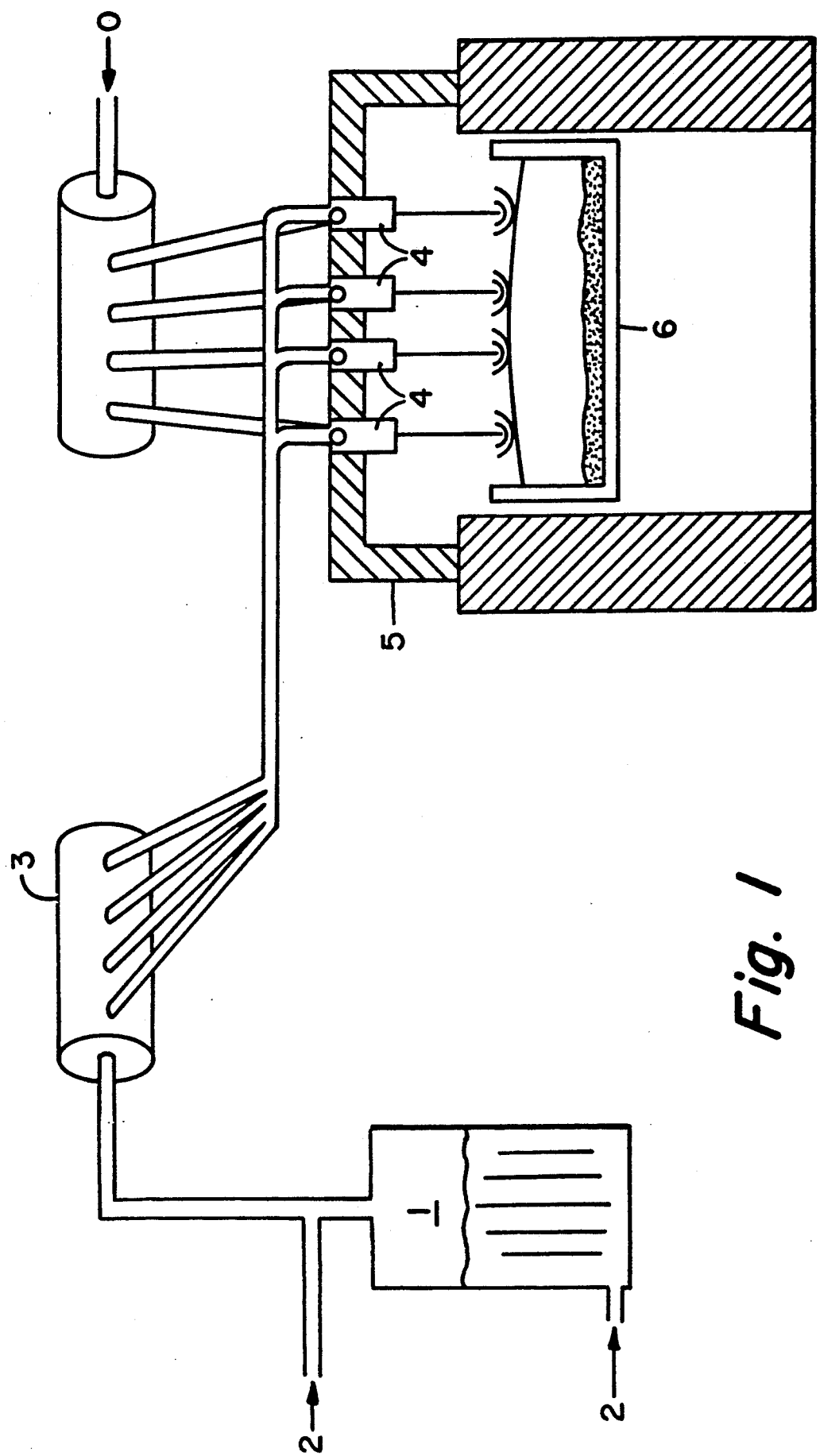
FIG. 1 comprises a schematic representation of the apparatus and process for forming large masses of fused silica.

The aforementioned system is illustrated in FIG. 1 wherein $SiCl_4$ was replaced with an OMCTS feedstock 1 in a commercial furnace to produce boules of high purity fused silica. An inert gas, nitrogen, was used as the carrier gas and a bypass stream of nitrogen 2 was introduced to prevent saturation of the vaporous stream. The vaporous reactant was passed through a distribution mechanism 3 to the reaction site wherein a number of burners 4 are present in close proximity to a furnace crown 5. The reactant was combined with a fuel/oxygen mixture 0 at these burners and combusted and oxidized at a temperature greater than 1700° C., directing high purity metal oxide soot and heat downward through the refractory furnace crown 5 where it is immediately deposited and consolidated to a non-porous mass on a hot bait 6.

In the production of relatively large boules, the maximum soot collection efficiencies measured using $SiCl_4$ as the feedstock have ranged about 60–70%. Extensive trials have indicated that the average deposition efficiency for boule process utilizing OMCTS as the source material is at least 10% higher than those processes using $SiCl_4$. Therefore, in addition to eliminating halide emissions, the quantity of particulate emissions is likewise reduced.

It is well recognized in the art that processing of the feedstock requires apparatus and transfer system capable of vaporizing the feedstock and delivering it to the burner in the vapor state. Somewhat higher temperatures ($\approx 104°-150°$ C.) are necessary with OMCTS due to its lower vapor pressure when compared to $SiCl_4$.

EXAMPLE 2

Four silica compounds, MTMS, DMCPS, HMDS, and HMCTS, were tested using Outside Vapor Deposition (OVD) technology. MTMS was tested a second time using a laboratory prototype of an existing commercial furnace; proficiency was demonstrated in producing fused silica glass with each compound.

EXAMPLE 3

A bench-scale furnace, modeled after a commercial furnace was constructed. MTMS, OMCTS, and TEOS (tetraethylorthosilicate) were tested. Existing commercial burners were used for deposition.

These tests demonstrated again that MTMS and OMCTS can be used to successfully produce high purity fused silica at deposition rates and efficiencies comparable to those of $SiCl_4$. Contrariwise, TEOS proved to be too difficult to control to be a satisfactory starting material.

Most of the processes being developed by industry today for the manufacture of optical waveguides employ the chemical vapor deposition (CVD) concept or a modified version thereof. In a CVD experiment, each of the component liquids is heated to a constant temperature at which enough vapor pressure is generated to produce a reasonable rate of deposition. The individual vapors are entrained in a carrier gas stream, mixed together prior to combustion to ensure homogeneous output, and then passed through a burner flame, usually a natural gas/oxygen mixture and frequently containing excess oxygen. The vapors in the mixture are converted to their respective oxides upon exiting the burner orifice to form a stream of volatile gases and finely-divided, amorphous, spherical aggregates, called soot. The soot is collected on a mandrel (OVD) or bait tube [Axial Vapor Deposition (AVD)] and deposited in thin layers. The final product of soot collection, the porous preform, is then subjected to high temperature in which the preform consolidates to a non-porous monolithic glassy body.

Figure 2:
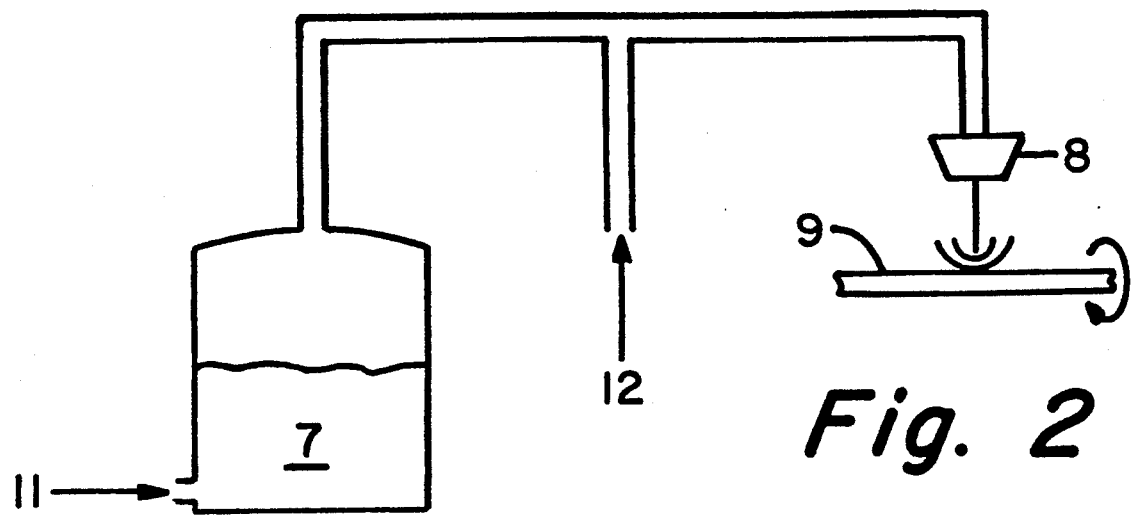
FIGS. 2 and 2A comprise schematic representations of the apparatus and process for depositing silica soot on a rotating mandrel to form a porous blank or preform.

In usual practice, the optical waveguide process is a three-step process. In the first stage of optical fiber fabrication, as depicted in FIG. 2, oxygen, the carrier gas, is bubbled through a liquid feedstock of $SiCl_4$ that is maintained at a constant temperature. The resulting vaporous reactant is transported to a reaction site, such as a burner, via a carrier gas, wherein the vaporous gas streams are combusted in a burner flame. The presence of oxygen serves to convert the vaporous reactants to their respective oxides, exiting the burner orifice to form a stream of volatile gases and finely-divided, amorphous, spherical particles of soot that are deposited onto a substrate, forming a porous blank or preform of opaque, white silica soot. Water, HCl, and carbon dioxide are emitted as by-products of this reaction.

Figure 3:
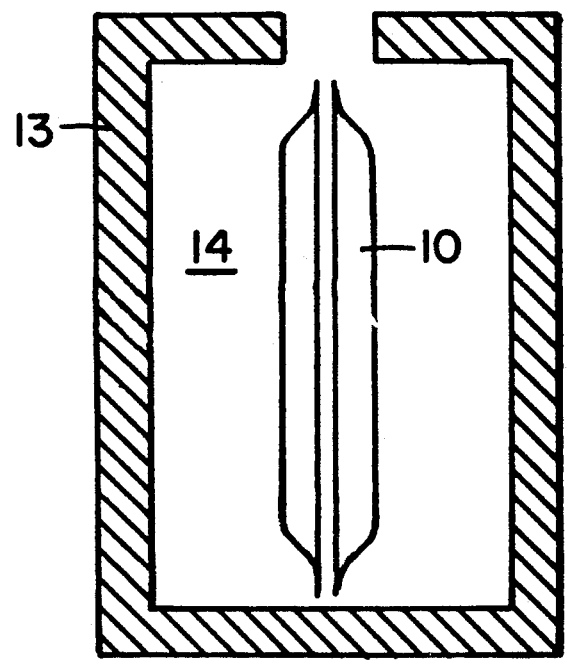
FIG. 3 comprises a schematic representation of a heating chamber wherein the porous blank is fired in an atmosphere of helium and chlorine to full consolidation to a non-porous body.

In the second stage, represented in FIG. 3, the blank or preform is subsequently heat treated in a helium/chlorine atmosphere to full consolidation. In the third and final stage, conventional fiber-draw technology is utilized in extracting optical waveguide fiber from the preform.

EXAMPLE 4

Figure 2A:
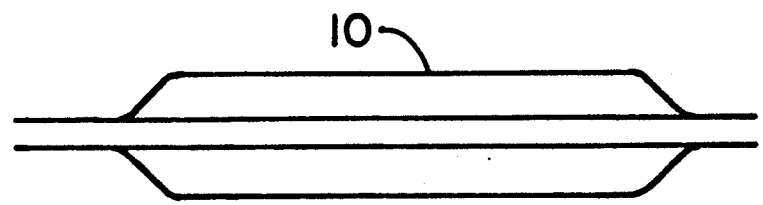

As indicated in FIG. 2, $SiCl_4$ was replaced with an OMCTS feedstock 7 in the standard OVD process used in making optical waveguides. An inert gas, nitrogen, was employed as the carrier gas 11 and a methane/oxygen mixture 12 was employed as the burner flame fuel, whereby combustion and oxidation was induced at the burner 8. The resulting soot was deposited on a rotating rod 9, thus forming a preform or blank 10 of silica soot shown at FIG. 2A. The preform was then heat treated in a consolidation furnace 13, in a $He/Cl_2$ atmosphere 14 to full consolidation. Conventional fiber draw techniques can then be employed in making optical waveguide fiber.

No additional equipment was required, but the delivery system had to be capable of vaporizing the material and delivering it to a standard OVD burner in the vapor state.

Figure 4:
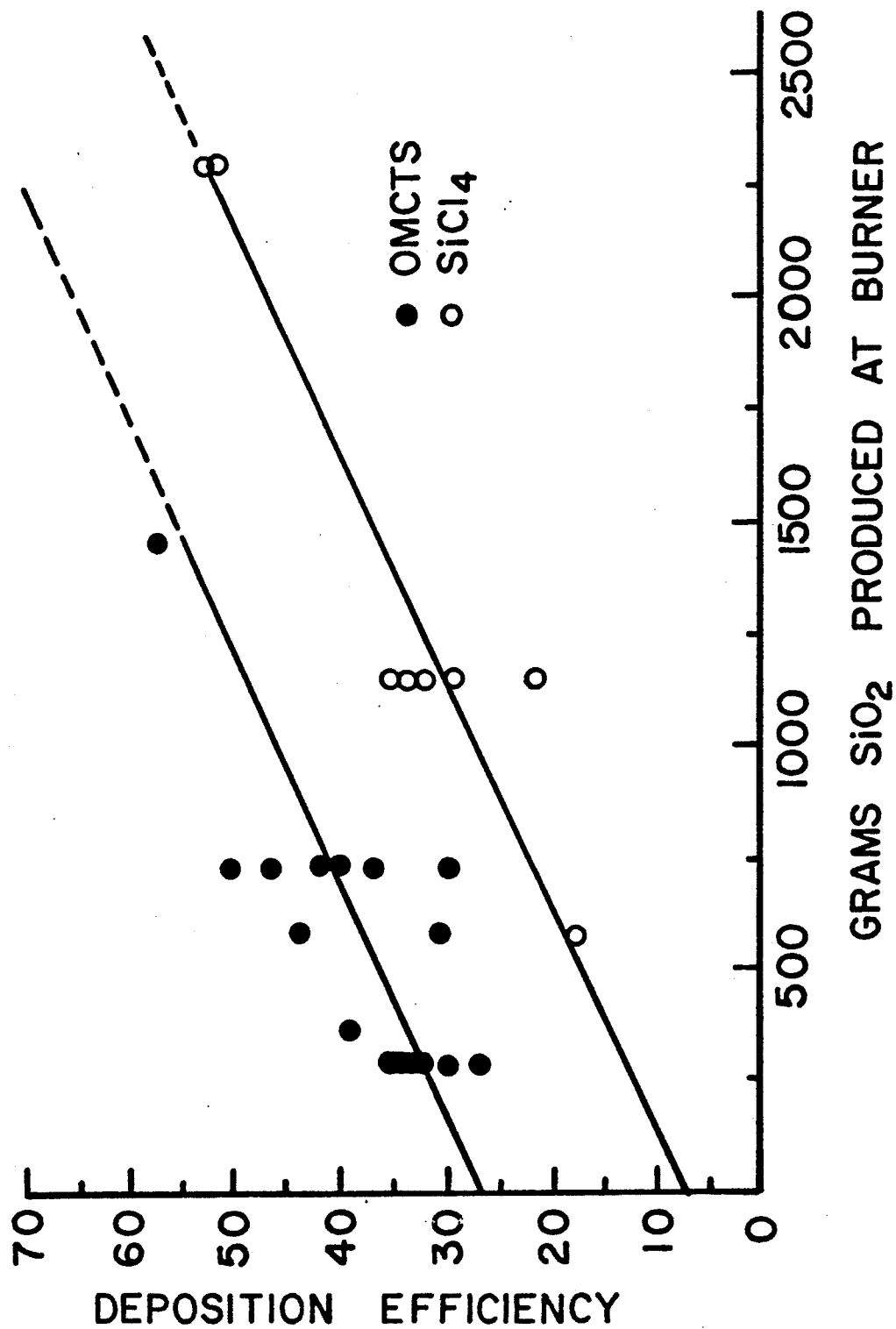
FIG. 4 graphically records the deposition efficiencies measured utilizing $SiCl_4$ and OMCTS as the silicon-containing source materials.

The observed deposition efficiency was an added benefit that may be specific to OMCTS. OMCTS-based soot was found to deposit more efficiently than $SiCl_4$-based soot. Initial deposition efficiencies were increased by about 20%. FIG. 4 shows this difference as a function of the total amount of $SiO_2$ produced at the burner for a specific blank size. Therefore, in addition to eliminating HCl emissions, OMCTS reduces the quantity of particulate emissions with accompanying increased production rates.

Although the cost of OMCTS by weight is higher than that of $SiCl_4$, when the amount of $SiO_2$ deposited from each of the two sources is compared, the cost per unit amount of $SiO_2$ deposited is approximately the same. To illustrate:

In optical waveguide production, deposition efficiency increases with increasing blank size. As deposition begins, collection deficiencies for $SiCl_4$ frequently are less than 10%, whereas the use of OMCTS can yield initial deposition efficiencies up to 25%. This factor of greater than twofold efficiency in deposition results in a corresponding increase in preform growth rate for equivalent rates of $SiO_2$ particles exiting the burner, and about a 20% by weight or more decrease in soot that has to be cleaned from the exhaust gases. (And in addition, of course, the use of OMCTS eliminates the costs involved in removing HCl from the exhaust gases.)

Examples 5 and 6 describe two other compounds which were investigated to produce high purity fused silica. These compounds, silane and methyltrichlorosilane (MTCS), are not the halide-free, silicon-containing compounds comprising the basis of the instant invention.

EXAMPLE 5

$SiCl_4$ was replaced with silane in the production of optical waveguide blanks. Though blanks were successfully produced, silane proved to be much too expensive and reactive to be considered for commercial use, except possibly for extremely high purity applications.

EXAMPLE 6

$SiCl_4$ was replaced in the production of optical waveguide blanks with MTCS. High purity fused silica glass preforms were successfully produced. Testing showed an estimated 25% reduction in chloride emissions when compared to the conventional use of $SiCl_4$.

While the principles of the instant invention have been described above in connection with specific embodiments and particular modifications thereof, it is to be clearly understood that this description is made only by way of example, and not as a limitation on the scope of the invention. Said principles may be otherwise embodied within the scope of the following claims.

We claim:

1. In a method for making a non-porous body of high purity fused silica glass comprising the steps of:
   (a) producing a gas stream containing a silicon-containing compound in vapor form capable of being converted through thermal decomposition with oxidation or flame hydrolysis to $SiO_2$;
   (b) passing said gas stream into the flame of a combustion burner to form amorphous particles of fused $SiO_2$;
   (c) depositing said amorphous particles onto a support; and
   (d) either essentially simultaneously with said deposition or subsequently thereto consolidating said deposit of amorphous particles into a non-porous body;

the improvement comprising utilizing as said silicon-containing compound in vapor form, a halide-free polymethylsiloxane, whereby no halide-containing vapors are emitted during the making of said non-porous body of high purity fused silica glass.

2. A method according to claim 1 wherein said polymethylsiloxane is hexamethyldisiloxane.

3. A method according to claim 1 wherein said polymethylsiloxane is a polymethylcyclosiloxane.

4. A method according to claim 3 wherein said polymethylcyclosiloxane is selected from the group consisting of octamethylcyclotetrasiloxane, decamethylcyclopentasiloxane, hexamethylcyclotrisiloxane, and mixtures thereof.

5. A method according to claim 1 wherein said gas stream is comprised of an inert gas.

6. A method according to claim 5 wherein said inert gas is nitrogen.

7. In a method for making a non-porous body of high purity fused silica glass doped with at least one oxide dopant comprising the steps of:
(a) producing a gas stream containing a silicon-containing compound in vapor form capable of being converted through thermal decomposition with oxidation or flame hydrolysis to $SiO_2$ and a compound in vapor form capable of being converted through oxidation or flame hydrolysis to at least one member of the group consisting of $P_2O_5$ and a metal oxide which has a metallic component selected from Group IA, IB, IIA, IIB, IIIA, IIIB, IVA, IVB, VA, and the rare earth series of the Periodic Table;
(b) passing said gas stream into the flame of a combustion burner to form amorphous particles of fused $SiO_2$ doped with an oxide dopant;
(c) depositing said amorphous particles onto a support; and
(d) either essentially simultaneously with said deposition or subsequently thereto consolidating said deposit of amorphous particles into a non-porous body;
the improvement comprising utilizing as said silicon-containing compound in vapor form a halide-free polymethylsiloxane, whereby no halide-containing vapors from said silicon-containing compound are emitted during the making of said non-porous body of high fused silica glass.

8. A method according to claim 7 wherein said polymethylsiloxane is hexamethyldisiloxane.

9. A method according to claim 7 wherein said polymethylsiloxane is a polymethylcyclosiloxane.

10. A method according to claim 9 wherein said polymethylcyclosiloxane is selected from the group consisting of octamethylcyclotetrasiloxane, decamethylcyclopentasiloxane, hexamethylcyclotrisiloxane, and mixtures thereof.

11. A method according to claim 7 wherein said compound in vapor form capable of being converted to at least one member of the group consisting of $P_2O_5$ and a metal oxide which has a metallic component selected from Group IA, IB, IIA, IIB, IIIA, IIIB, IVA, IVB, VA, and the rare earth series of the Periodic Table is a halide-containing compound.

12. A method according to claim 7 wherein said compound in vapor form capable of being converted to at least one member of the group consisting of $P_2O_5$ and a metal oxide which has a metallic component selected from Group IA, IB, IIA, IIB, IIIA, IIIB, IVA, IVB, VA, and the rare earth series of the Periodic Table is a halide-free compound.

13. In a method for making optical waveguide fibers of high purity fused silica through the outside vapor deposition process comprising the steps of:
(a) producing a gas stream containing a silicon-containing compound in vapor form capable of being converted through thermal decomposition with oxidation or flame hydrolysis to $SiO_2$;
(b) passing said gas stream into the flame of a combustion burner to form amorphous particles of fused $SiO_2$;
(c) depositing said amorphous particles onto a mandrel;
(d) consolidating said deposit of amorphous particles into a non-porous, transparent glass body; and
(e) and drawing optical waveguide fiber from said body;
the improvement comprising utilizing as said silicon-containing compound in vapor form a halide-free polymethylsiloxane, whereby no halide-containing vapors are emitted during the making of said optical waveguide fibers.

14. A method according to claim 13 wherein said polymethylsiloxane is hexamethyldisiloxane.

15. A method according to claim 13 wherein said polymethylsiloxane is a polymethylcyclosiloxane.

16. A method according to claim 15 wherein said polymethylcyclosiloxane is selected from the group consisting of octamethylcyclotetrasiloxane, decamethylcyclopentasiloxane, hexamethylcyclotrisiloxane, and mixtures thereof.

17. In a method for making optical waveguide fibers of high purity fused silica glass doped with an oxide dopant comprising the steps of:
(a) producing a gas stream containing a silicon-containing compound in vapor form capable of being converted through thermal decomposition with oxidation or flame hydrolysis to $SiO_2$ and a compound in vapor form capable of being converted through oxidation or flame hydrolysis to at least one member of the group consisting of $P_2O_5$ and a metal oxide which has a metallic component selected from Group IA, IB, IIA, IIB, IIIA, IIIB, IVA, IVB, VA, and the rare earth series of the Periodic Table;
(b) passing said gas stream into the flame of a combustion burner to form amorphous particles of fused $SiO_2$ doped with an oxide dopant;
(c) depositing said amorphous particles onto a mandrel;
(d) consolidating said deposit of amorphous particles into a non-porous transparent glass body; and
(e) drawing waveguide fiber from said body;
the improvement comprising utilizing as said silicon-containing compound in vapor form a halide-free polymethylsiloxane, whereby no halide-containing vapors from said silicon-containing compound are emitted during the making of said optical waveguide fibers.

18. A method according to claim 17 wherein said polymethylsiloxane is hexamethyldisiloxane.

19. A method according to claim 17 wherein said polymethylsiloxane is a polymethylcyclosiloxane.

20. A method according to claim 19 wherein said polymethylcyclosiloxane is selected from the group consisting of octamethylcyclotetrasiloxane, decamethylcyclopentasiloxane, hexamethylcyclotrisiloxane, and mixtures thereof.

21. A method according to claim 17 wherein said compounding vapor form capable of being converted to at least one member of the group consisting of $P_2O_5$ and a metal oxide which has a metallic component selected from Group IA, IB, IIA, IIB, IIIA, IIIB, IVA, IVB, VA, and the rare earth series of the Periodic Table is a halide-containing compound.

22. A method according to claim 17 wherein said compound in vapor form capable of being converted to at least one member of the group consisting of $P_2O_5$ and a metal oxide which has a metallic component selected from Group IA, IB, IIA, IIB, IIIA, IIIB, IVA, IVB, VA, and the rare earth series of the Periodic Table is a halide-free compound.

23. In a method for making high purity fused silica glass through the outside vapor deposition process comprising the steps of:
(a) producing a gas stream containing a silicon-containing compound in vapor form capable of being converted through thermal decomposition with oxidation or flame hydrolysis to $SiO_2$;
(b) passing said gas stream into the flame of a combustion burner to form amorphous particles of fused $SiO_2$;
(c) depositing said amorphous particles onto a mandrel; and
(d) consolidating said deposit of amorphous particles into a non-porous, transparent glass body;
the improvement comprising utilizing as said silicon-containing compound in vapor form a halide-free polymethylsiloxane, whereby no halide-containing vapors from said silicon-containing compound are emitted during the making of said high purity fused silica glass.

24. A method according to claim 23 wherein said polymethylsiloxane is hexamethyldisiloxane.

25. A method according to claim 23 wherein said polymethylsiloxane is a polymethylcyclosiloxane.

26. A method according to claim 25 wherein said polymethylcyclosiloxane is selected from the group consisting of octamethylcyclotetrasiloxane, decamethylcyclopentasiloxane, hexamethylcyclotrisiloxane, and mixtures thereof.

* * * * *